(12) United States Patent
Lin et al.

(10) Patent No.: US 10,996,175 B2
(45) Date of Patent: May 4, 2021

(54) AUTOMATIC QUALITY INSPECTION MACHINE AND CONTROL METHOD THEREOF

(71) Applicant: Guangzhou Pulisi Technology Co., Ltd., Guangdong (CN)

(72) Inventors: Xiaobo Lin, Guangdong (CN); Lu Liu, Guangdong (CN)

(73) Assignee: Guangzhou Pulisi Technology Co., Ltd., Guangzhou (CN)

( * ) Notice: Subject to any disclaimer, the term of this patent is extended or adjusted under 35 U.S.C. 154(b) by 93 days.

(21) Appl. No.: 16/389,946

(22) Filed: Apr. 20, 2019

(65) Prior Publication Data

US 2020/0173934 A1 Jun. 4, 2020

(30) Foreign Application Priority Data

Nov. 30, 2018 (CN) .......................... 201811452678.8

(51) Int. Cl.
| | |
|---|---|
| *G01N 21/89* | (2006.01) |
| *B41F 19/00* | (2006.01) |
| *B41F 33/00* | (2006.01) |
| *G01N 21/88* | (2006.01) |
| *G06T 7/00* | (2017.01) |

(52) U.S. Cl.
CPC ............ *G01N 21/89* (2013.01); *B41F 19/008* (2013.01); *B41F 33/0036* (2013.01); *G01N 21/8803* (2013.01); *G01N 21/8806* (2013.01); *G06T 7/0004* (2013.01); *B41P 2251/00* (2013.01); *G06T 2207/30144* (2013.01)

(58) Field of Classification Search
CPC .............. G01N 21/89; G01N 21/8803; G01N 21/8806; G01N 21/8914; B41F 19/008; B41F 33/0036; B41P 2251/00; B65H 18/103; B65H 75/242; B65H 2701/19; B26D 1/245; B26D 7/015; B26D 7/27
See application file for complete search history.

(56) References Cited

U.S. PATENT DOCUMENTS 5,682,473 A * 10/1997 Carson ................ G06F 11/3604
714/38.1
6,185,001 B1 * 2/2001 Webendorfer ......... G06K 15/00
347/19

(Continued)

*Primary Examiner* — John B Strege

(57) ABSTRACT

The present invention has disclosed an automatic quality inspection machine and a control method thereof, which relates to the technical field of inspection devices. The machine comprises a frame, an unrolling device provided at the frame, an inspection mechanism, a button operating platform for removing a defective roll-type printing product, a slitting mechanism, a main controller, a display device, and a rolling device. The rolling device includes a first rolling mechanism and a second rolling mechanism, the first rolling mechanism includes a first rolling airshaft and a first outgoing feed roller corresponding to the first rolling airshaft; the second rolling mechanism includes a second rolling airshaft and a second outgoing feed roller corresponding to the second rolling airshaft. The automatic quality inspection machine has a number of advantages including multifunctional, highly automatic, and high inspection accuracy; the machine could quickly replace rolls and could effectively increase production efficiency.

18 Claims, 2 Drawing Sheets

(56) References Cited

U.S. PATENT DOCUMENTS

| | | | |
|---|---|---|---|
| 2011/0231008 A1* | 9/2011 | McIntee | G07B 17/00459 |
| | | | 700/222 |
| 2014/0117084 A1* | 5/2014 | Wooldridge | G06K 7/0013 |
| | | | 235/375 |
| 2017/0232770 A1* | 8/2017 | Akiyama | G01N 21/84 |
| | | | 347/51 |
| 2017/0249380 A1* | 8/2017 | Hosokawa | G06F 8/70 |
| 2019/0224963 A1* | 7/2019 | Numauchi | G01N 21/8806 |
| 2020/0072759 A1* | 3/2020 | Kawai | H04N 1/00039 |
| 2020/0223574 A1* | 7/2020 | Tong | B65B 57/04 |

* cited by examiner

AUTOMATIC QUALITY INSPECTION MACHINE AND CONTROL METHOD THEREOF

CROSS-REFERENCE TO RELATED APPLICATIONS

The present application claims the benefit of Chinese Patent Application No. 201811452678.8 filed on Nov. 30, 2018. The contents of the above are hereby incorporated by reference.

FIELD OF THE INVENTION

The present invention relates to the technical field of inspection devices and in particular involves an automatic quality inspection machine and a control method thereof.

BACKGROUND OF THE INVENTION

At present, the inspection of roll-type printing products is carried out by a semi-multifunctional machine; in this process, the core steps, including quality inspection and defect judgment and removal, are carried out manually. Quality inspection is carried out at high speeds due to efficiency requirements. The label products under inspection move too quickly for human eyes to clearly judge their printing quality. As a result, printing defects and inaccurate positioning during printing cannot be corrected promptly, resulting in poor printing quality. This affects the quality of the printing products and increases printing costs. In addition, traditional quality inspection machines are configured to carry out only one function; they are not highly automatic. Rolls could only be installed after the rolling airshaft has collected all the products and has been removed, which is extremely time-consuming and labor intensive.

SUMMARY OF THE INVENTION

In view of the above, the objective of the present invention is to provide an automatic quality inspection machine and a control method thereof, the automatic quality inspection machine has a number of functions, is highly automatic, and can automatically replace materials.

The technical solution of the present invention is as follows:

An automatic quality inspection machine, which comprises a frame, an unrolling device provided at the frame, an inspection mechanism, a button operating platform for removing a defective roll-type printing product, a slitting mechanism, a main controller, a display device, and a rolling device; a paper movement route is provided between the unrolling device and the rolling device; the inspection mechanism, the button operating platform, and the slitting mechanism are provided at the paper movement route along a paper movement direction; a number of guiding rollers are provided along the paper movement route;

the inspection mechanism includes a camera for photographing a roll-type printing product, a light source for assisting the camera, and a case; the camera and the light source are provided in the case; the case and the paper movement route correspond to each other; the inspection mechanism and the display device are respectively electrically connected to the main controller; the rolling device includes a first rolling mechanism and a second rolling mechanism; the first rolling mechanism includes a first rolling airshaft and a first outgoing feed roller corresponding to the first rolling airshaft; the second rolling mechanism includes a second rolling airshaft and a second outgoing feed roller corresponding to the second rolling airshaft.

In the automatic quality inspection machine described above, the camera and the light source are provided in the case; the case and the paper movement route correspond to each other; the inspection mechanism and the display device are electrically connected to the main controller respectively. Via these settings, the inspection mechanism has a three-dimensional light source system, which gives rise to wider applications in defect detection. The rolling device includes a first rolling mechanism and a second rolling mechanism; the first rolling mechanism includes a first rolling airshaft and a first outgoing feed roller corresponding to the first rolling airshaft; the second rolling mechanism includes a second rolling airshaft and a second outgoing feed roller corresponding to the second rolling airshaft. As a result, when the first rolling mechanism is carrying out a rolling operation, a paper strip of the roll-type printing product is installed at the first rolling airshaft along the first outgoing feed roller at the paper movement route; when the rolling operation of the first rolling mechanism is finishing, a paper core is installed at the second rolling mechanism; the paper strip of the roll-type printing product is installed at the second rolling airshaft along the second outgoing feed roller at the paper movement route. The process repeats and the rolling operation does not have to be finished for material replacement to take place, which effectively increases efficiency. In addition, the frame is sequentially provided with the unrolling device, the inspection mechanism, the button operating platform, the slitting mechanism, and the rolling device. The unrolling device and the rolling device could coordinate with the guiding rollers to automatically unroll and roll. The inspection mechanism could inspect at a high precision. The button operating platform replaces defective roll-type printing products. The slitting mechanism divides roll-type printing products into two parts or a number of parts. These features of the automatic quality inspection machine bring a number of advantages including high automation level, high inspection precision, high inspection efficiency, multi-functional, and quick material replacement. The automatic quality inspection machine removes the need for extensive manual operation and has high production efficiency.

In one embodiment of the present invention, the second rolling airshaft is provided below the first rolling airshaft and is arranged perpendicularly; the second outgoing feed roller is provided below the first outgoing feed roller and is arranged perpendicularly.

In one embodiment of the present invention, the first rolling airshaft comprises a first air source switch; the second rolling airshaft comprises and a second air source switch.

In one embodiment of the present invention, the slitting mechanism includes an incoming feed guiding roller, an upper cutter mechanism, a lower cutter mechanism, and an outgoing feed guiding roller; the upper cutter mechanism is located above the lower cutter mechanism; both the upper cutter mechanism and the lower cutter mechanism have an eccentric self-locking structure; the incoming feed guiding roller and the outgoing feed guiding roller are provided on both sides of the upper cutter mechanism and the lower cutter mechanism.

In one embodiment of the present invention, the upper cutter mechanism includes an upper cutter shaft and a slitting upper cutter; the lower cutter mechanism includes a lower cutter shaft, a slitting lower cutter, and a lower cutter motor which is connected to the lower cutter shaft and drives rotation of the lower cutter shaft; the lower cutter shaft meshes with the upper cutter shaft; the lower cutter motor drives the lower cutter shaft to rotate and to move close to or away from the upper cutter shaft.

In one embodiment of the present invention, the frame further includes a traction device; the traction device is disposed between the inspection mechanism and the button operating platform.

In one embodiment of the present invention, the traction device includes a traction shaft, a paper pressing rubber roller, and a cylinder which is connected to and drives the paper pressing rubber roller; the cylinder drives the paper pressing rubber roller to be in contact with or move away from the traction shaft.

In one embodiment of the present invention, the frame further includes a first corrector and a second corrector; the first corrector is disposed between the unrolling device and the inspection mechanism; the second corrector is disposed between the button operating platform and the slitting mechanism.

In one embodiment of the present invention, the display device is provided directly above the button operating platform.

In one embodiment of the present invention, the button operating platform includes an operation button which is electrically connected to the main controller.

In one embodiment of the present invention, the frame further comprises a human-computer operating system; the human-computer operating system is electrically connected to the main controller.

The present invention also provides a control method for the automatic quality inspection machine, which comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others;

pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; stopping the label at the button operating platform when the main controller detects a defect in the label, moving the label to the slitting mechanism after processing the label with the defect;

slitting the label into two parts or more parts by the slitting mechanism according to the equipment parameters set;

installing the label strip at the second rolling airshaft or the first rolling airshaft after the first rolling airshaft or the second rolling airshaft collects all labels.

In the control method for the automatic quality inspection machine described above, the roll-type printing product is mounted on the unrolling device; the label strip sequentially passes the first corrector, the inspection mechanism, the first traction device, the button operating platform, the second corrector, the second traction device, and the slitting mechanism along the guiding roller in the paper movement route; and the label strip is installed at the first rolling airshaft or the second rolling airshaft. By setting equipment parameters in the human-computer operating system, automatic feeding, automatic correction, automatic inspection, the removal of defective roll-type printing products, automatic slitting, and automatic material collection can be carried out easily and without extensive manual operation. Furthermore, when the main controller detects a defective roll-type printing product, the label is stopped at the button operating platform. This allows the operator to carry out another inspection to ensure that all defects could be detected. In addition, after the first rolling airshaft or the second rolling airshaft collects all the labels, the label paper strip could be directly installed at the second rolling airshaft or the first rolling airshaft via the second outgoing feed roller or the first outgoing feed roller for quick material replacement; no waiting is required. As a result, the automatic quality inspection machine is highly automatic, efficient, accurate, has a number of functions, and is easy to operate.

REFERENCE NUMERALS

1—frame; 2—unrolling device; 3—inspection mechanism; 4—button operating platform; 5—slitting mechanism; 501—upper cutter shaft; 502—slitting upper cutter; 503—lower cutter shaft; 504—slitting lower cutter; 6—display device; 7—second rolling airshaft; 8—first rolling airshaft; 9—guiding roller; 10—traction shaft; 11—paper pressing rubber roller; 12—first corrector; 13—second corrector; 14—human-computer operating system.

DETAILED DESCRIPTION OF THE ILLUSTRATED EMBODIMENTS

The technical solutions in the embodiments of the present invention are clearly and completely described hereafter with reference to the accompanying drawings and the embodiments of the present invention. It is obvious that the described embodiments are only some of the possible embodiments of the present invention. All other embodiments obtained by those skilled in the art based on the embodiments of the present invention without creative efforts are within the scope of the present invention.

Figure 1:
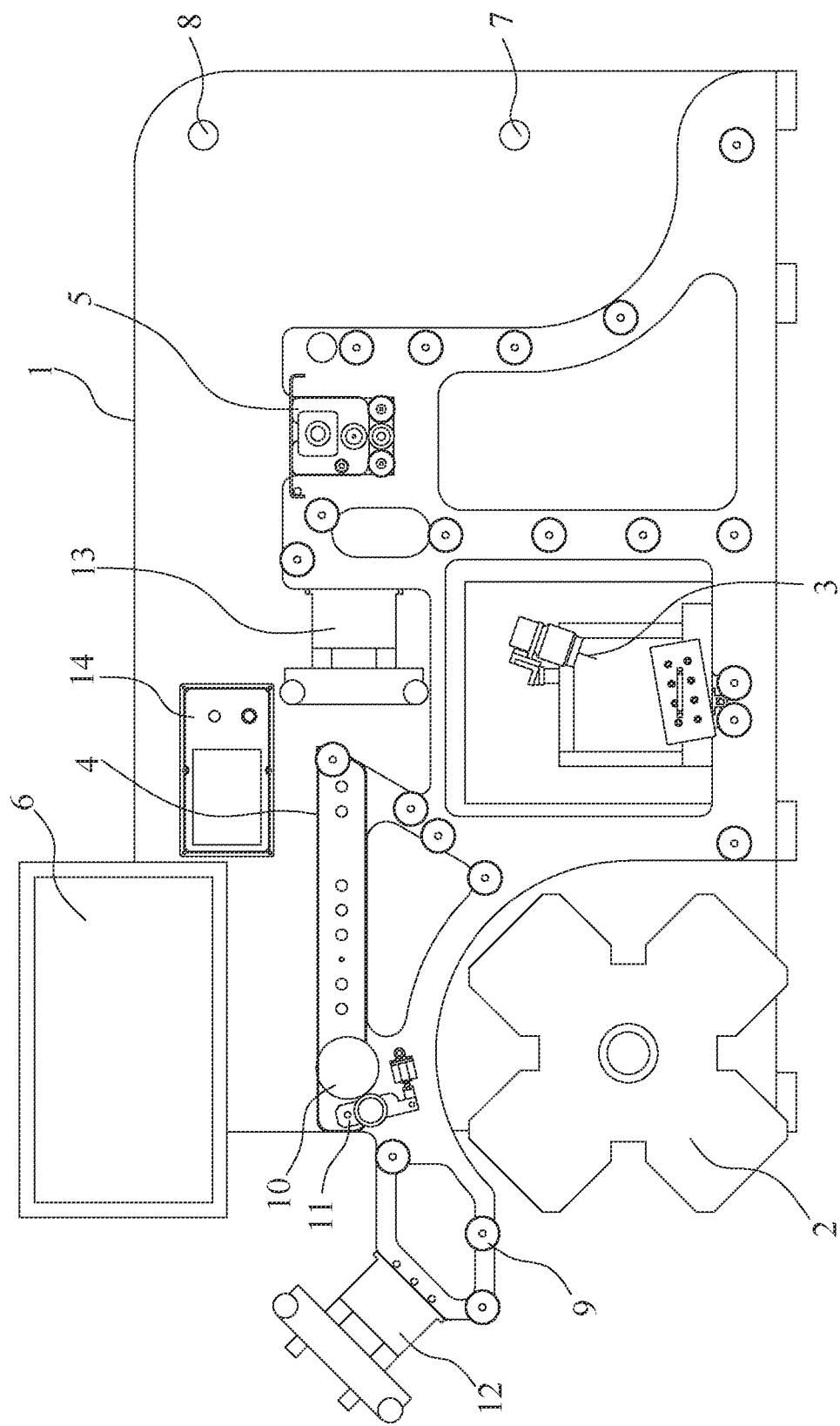
FIG. 1 is a schematic diagram of an automatic quality inspection machine according to an embodiment of the present invention.
Figure 2:
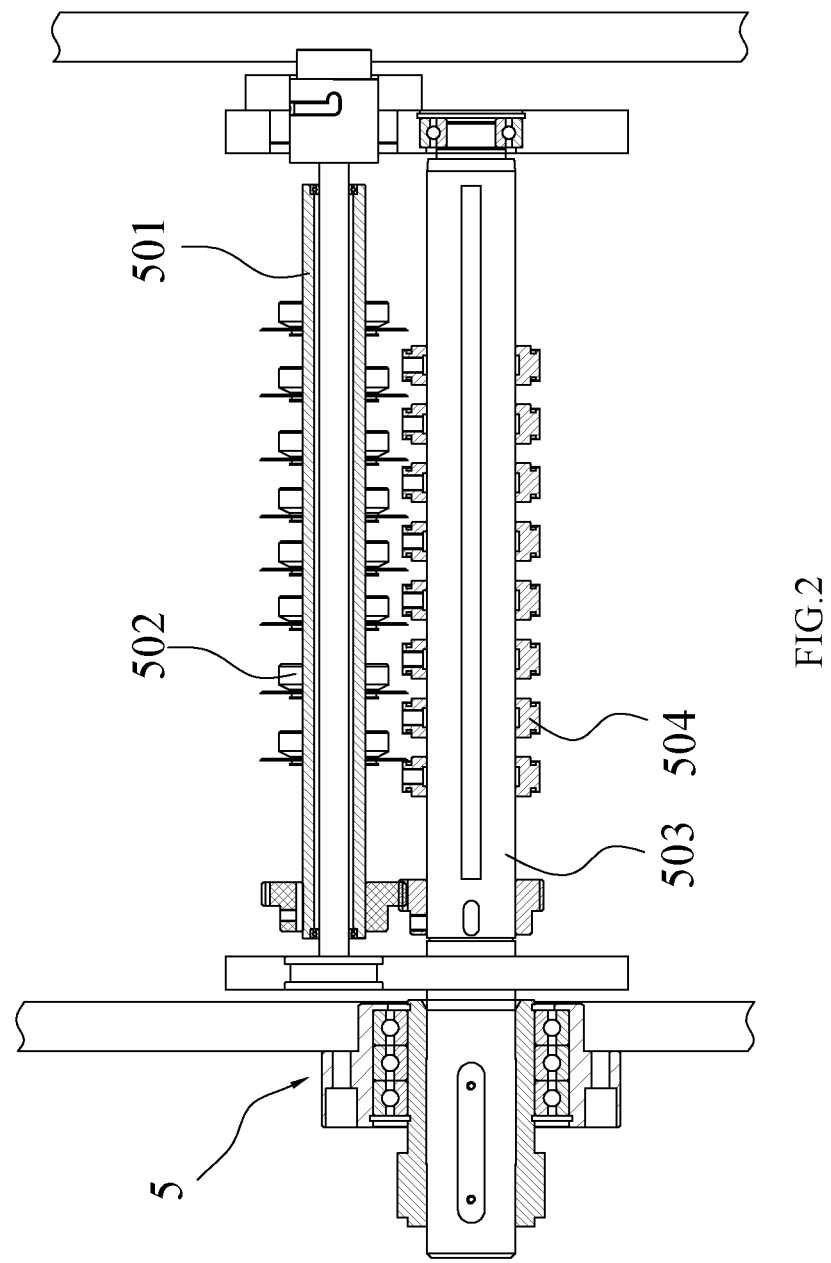
FIG. 2 is a schematic diagram of a slitting mechanism according to an embodiment of the present invention.

FIGS. 1 and 2 illustrate a preferred embodiment of the automatic quality inspection machine. The machine includes a frame 1; the frame is provided with an unrolling device 2, an inspection mechanism 3, a button operating platform 4, a slitting mechanism 5, a main controller, a display device 6 and a rolling device; the button operating platform 4 is used to remove defective roll-type printing products. A paper movement route is provided between the unrolling device 2 and the rolling device. The inspection mechanism 3, the button operating platform 4, and the slitting mechanism 5 are provided at the paper movement route along the paper movement direction. A number of guiding rollers 9 are provided along the paper movement route.

The inspection mechanism 3 includes a camera for photographing the roll-type printing products, a light source for assisting the camera, and a case; the camera and the light source are provided in the case. The case and the paper movement route correspond to each other so that the photographing section of the camera is directly facing the paper movement route. The inspection mechanism 3 and the display device 6 are respectively electrically connected to the main controller. The rolling device includes a first rolling mechanism and a second rolling mechanism; the first rolling mechanism includes a first rolling airshaft 8 and a first outgoing feed roller 81, the paper movement route passes the first outgoing feed roller 81 to reach the first rolling airshaft 8; the second rolling mechanism includes a second rolling airshaft 7 and a second outgoing feed roller 71, the paper movement route passes the second outgoing feed roller 71 to reach the second rolling airshaft.

In the automatic quality inspection machine described above, the camera and the light source are provided in the case; the case and the paper movement route correspond to each other; the inspection mechanism 3 and the display device 6 are electrically connected to the main controller respectively. Via these settings, the inspection mechanism 3 has a three-dimensional light source system, which gives rise to wider applications in defect detection. The first rolling mechanism includes a first rolling airshaft 8 and a first outgoing feed roller 81; the second rolling mechanism includes a second rolling airshaft 7 and a second outgoing feed roller 71. As a result, when the first rolling mechanism is carrying out a rolling operation, a paper tube (not shown in the figures) for storing a paper strip is installed at the first rolling airshaft 8; the paper strip of the roll-type printing product passes and is supported by the first outgoing feed roller 81 along the paper movement route; when the rolling operation of the first rolling mechanism is finishing, a paper core is installed at the second rolling mechanism; a paper strip of a roll-type printing product is installed at the second rolling airshaft 7 along the second outgoing feed roller 71 at the paper movement route. The process repeats and the material replacement does not have to be carried out after the rolling operation is finished, which effectively increases efficiency. In addition, the frame 1 is sequentially provided with the unrolling device 2, the inspection mechanism 3, the button operating platform 4, the slitting mechanism 5, and the rolling device. The unrolling device 2 and the rolling device could coordinate with the guiding rollers to automatically unroll and roll. The inspection mechanism 3 could inspect at high precision. The button operating platform 4 replaces defective roll-type printing products. The slitting mechanism 5 divides roll-type printing products into two parts or a number of parts. These features of the automatic quality inspection machine bring a number of advantages including high automation level, high inspection precision, high inspection efficiency, multi-functional, and quick material replacement. The automatic quality inspection machine removes the need for extensive manual operation and has high production efficiency.

The second rolling airshaft 7 is provided below the first rolling airshaft 8 and is arranged perpendicularly. The second outgoing feed roller 71 is provided below the first outgoing feed roller 81 and is arranged perpendicularly. Through these settings, the label paper strip can either be fed along the first outgoing feed roller 81 or the second outgoing feed roller 71, avoiding potential problems caused by the cross-feeding of paper, increasing the smoothness and the reliability of the paper feeding process.

Optionally, the first rolling airshaft 8 comprises a first air source switch; the second airshaft 7 comprises a second air source switch. The first air source switch or the second air source switch can be pressed to quickly hold the paper core tightly after all material is collected, effectively increasing efficiency.

In addition, the frame 1 further includes a traction device. The traction device is disposed between the inspection mechanism 3 and the button operating platform 4. The traction device leads the paper movement route and increases the tension of the paper in movement, ensuring the roll-type printing product moves smoothly along the paper movement route. The traction device includes a traction shaft 10, a paper pressing rubber roller 11, and a cylinder which is connected to and drives the paper pressing rubber roller 11. The cylinder drives the paper pressing rubber roller 11 to be in contact with or move away from the traction shaft 10. The cylinder drives the paper pressing rubber roller 11 to press towards or move away from the traction shaft 10. The roll-type printing product is pressed by the traction device, which is driven by pneumatic energy. The working principle is simple, and the coordination between the paper pressing rubber roller 11 and the traction shaft 10 can be effectively controlled to achieve automation.

In this embodiment, the frame 1 further includes a first corrector 12 and a second corrector 13. The first corrector 12 is disposed between the unrolling device 2 and the inspection mechanism 3. The second corrector 13 is disposed between the button operating platform 4 and the slitting mechanism 5. By providing the first corrector 12 and the second corrector 13 on the frame 1, the roll-type printing products can be corrected during the paper feeding process to keep the sides of the roll-type printing products aligned.

Optionally, the display device 6 is provided directly above the button operating platform 4. Defective roll-type printing products can be easily detected at the button operating platform 4 via the display device 6, improving the efficiency of defective product removal. In addition, the button operating platform 4 includes operation buttons which are electrically connected to the main controller. The machine can be quickly stopped, started, and any malfunction can be reported via the operation buttons.

To more conveniently set equipment parameters, the frame 1 further includes a human-computer operating system 14. The human-computer operating system 14 is electrically connected to the main controller. The equipment parameters can be quickly set via the human-computer operating system 16, effectively improving efficiency.

Referring to FIG. 3, the slitting mechanism 5 in the embodiment includes an incoming feed guiding roller 51, an upper cutter mechanism, a lower cutter mechanism, and an outgoing feed guiding roller 52. The upper cutter mechanism is located above the lower cutter mechanism. Both the upper cutter mechanism and the lower cutter mechanism have an eccentric self-locking structure. The incoming feed guiding roller and the outgoing feed guiding roller are provided on both sides of the upper cutter mechanism and the lower cutter mechanism; this arrangement allows the pressing of the roll-type printing product so that it could move past the upper cutter mechanism and lower cutter mechanism smoothly and steadily for slitting. Furthermore, the upper cutter mechanism includes an upper cutter shaft 501 and a slitting upper cutter 502; the lower cutter mechanism includes a lower cutter shaft 503, a slitting lower cutter 504, and a lower cutter motor which is connected to the lower cutter shaft 503 and drives its rotation. The lower cutter shaft 503 meshes with the upper cutter shaft 501; the lower cutter motor drives the lower cutter shaft 503 to rotate and to move close to or away from the upper cutter shaft 501; this arrangement allows the upper cutter mechanism and the lower cutter mechanism to simultaneously perform the slitting operation, which resembles the working of a pair of scissors. The slitting mechanism can quickly cut the roll-type printing product into two parts or a number of parts, effectively increasing efficiency.

The present embodiment further provides a control method for the automatic quality inspection machine, which comprises the following steps:

installing a roll-type printing product at the unrolling device 2; allowing a label strip to sequentially pass the first corrector 12, the inspection mechanism 3, the first traction device, the button operating platform 4, the second corrector 13, the second traction device, and the slitting mechanism 5 along the guiding rollers 9 in the paper movement route; installing the label strip at the first rolling airshaft 8 or the second rolling airshaft 7;

setting equipment parameters in the human-computer operating system 14, the equipment parameters include paper movement speed, slitting function, traction tension, among others; pressing a start operation button at the button operating platform 4;

photographing a label to acquire an image by the camera which is assisted by the light source;

transmitting the image to the main controller by the inspection mechanism;

transmitting the image from the main controller to the display device 6 to analyze the image;

moving the label to the slitting mechanism 5 when the main controller detects that the label is free from defects;

stopping the label at the button operating platform 4 when the main controller detects a defect in the label, moving the label to the slitting mechanism 5 after processing the label with the defect;

slitting the label into two parts or more parts by the slitting mechanism 5 according to the equipment parameters set;

installing the label strip at the second rolling airshaft 7 or the first rolling airshaft 8 after the first rolling airshaft 8 or the second rolling airshaft 7 collects all the labels.

In the control method for the automatic quality inspection machine described above, the roll-type printing product is mounted on the unrolling device 2; a label strip sequentially passes the first corrector 12, the inspection mechanism 3, the first traction device, the button operating platform 4, the second corrector 13, the second traction device, and the slitting mechanism 5 along the guiding roller 9 in the paper movement route; and the label strip is installed at the first rolling airshaft 8 or the second rolling airshaft 7. By setting equipment parameters in the human-computer operating system 14, automatic feeding, automatic correction, automatic inspection, the removal of defective roll-type printing products, automatic slitting, and automatic material collection can be carried out easily and without extensive manual operation. Furthermore, when the main controller detects a defective roll-type printing product, the label is stopped at the button operating platform 4. This allows the operator to carry out another inspection to ensure that all defects could be detected. In addition, after the first rolling airshaft 8 or the second rolling airshaft 7 collects all the labels, the label paper strip could be installed at the second rolling airshaft 7 or the first rolling airshaft 8 via the second outgoing feed roller or the first outgoing feed roller for quick material replacement; no waiting is required. As a result, the automatic quality inspection machine is highly automatic, efficient, accurate, has a number of functions, and is easy to operate.

It should be understood that the terms "first", "second", and the like are used in the present invention to describe various information, but the information should not be limited to these terms, and these terms are only used to distinguish the same type of information from each other. For example, without departing from the scope of the invention, the "first" information may also be referred to as the "second" information; similarly, the "second" information may also be referred to as the "first" information.

The above is only a preferred embodiment of the present invention. It should be noted that those skilled in the art can make improvements and substitutions without departing from the technical principles of the present invention. These improvements and substitutions should also be considered as within the scope of protection of the present invention.

What is claimed is:

1. An automatic quality inspection machine, wherein it comprises a frame, an unrolling device provided at the frame, an inspection mechanism, a button operating platform for removing a defective roll-type printing product, a slitting mechanism, a main controller, a display device, and a rolling device; a paper movement route is provided between the unrolling device and the rolling device; the inspection mechanism, the button operating platform, and the slitting mechanism are provided at the paper movement route along a paper movement direction; a number of guiding rollers are provided along the paper movement route; the inspection mechanism includes a camera for photographing a roll-type printing product, a light source for assisting the camera, and a case; the camera and the light source are provided in the case; the case and the paper movement route correspond to each other; the inspection mechanism and the display device are respectively electrically connected to the main controller; the rolling device includes a first rolling mechanism and a second rolling mechanism; the first rolling mechanism includes a first rolling airshaft and a first outgoing feed roller corresponding to the first rolling airshaft; the second rolling mechanism includes a second rolling airshaft and a second outgoing feed roller corresponding to the second rolling airshaft;

wherein the second rolling airshaft is provided below the first rolling airshaft and is arranged perpendicularly; the second outgoing feed roller is provided below the first outgoing feed roller and is arranged perpendicularly.

2. The automatic quality inspection machine according to claim 1, wherein the first rolling airshaft comprises a first air source switch; the second rolling airshaft comprises and a second air source switch.

3. The automatic quality inspection machine according to claim 1, wherein the slitting mechanism includes an incoming feed guiding roller, an upper cutter mechanism, a lower cutter mechanism, and an outgoing feed guiding roller; the upper cutter mechanism is located above the lower cutter mechanism; both the upper cutter mechanism and the lower cutter mechanism have an eccentric self-locking structure; the incoming feed guiding roller and the outgoing feed guiding roller are provided on both sides of the upper cutter mechanism and the lower cutter mechanism.

4. The automatic quality inspection machine according to claim 3, wherein the upper cutter mechanism includes an upper cutter shaft and a slitting upper cutter; the lower cutter mechanism includes a lower cutter shaft, a slitting lower cutter, and a lower cutter motor which is connected to the lower cutter shaft and drives rotation of the lower cutter shaft; the lower cutter shaft meshes with the upper cutter shaft; the lower cutter motor drives the lower cutter shaft to rotate and to move close to or away from the upper cutter shaft.

5. The automatic quality inspection machine according to claim 1, wherein the frame further includes a traction device; the traction device is disposed between the inspection mechanism and the button operating platform.

6. The automatic quality inspection machine according to claim 5, wherein the traction device includes a traction shaft, a paper pressing rubber roller, and a cylinder which is connected to and drives the paper pressing rubber roller; the cylinder drives the paper pressing rubber roller to be in contact with or move away from the traction shaft.

7. The automatic quality inspection machine according to claim 1, wherein the frame further includes a first corrector and a second corrector; the first corrector is disposed between the unrolling device and the inspection mechanism; the second corrector is disposed between the button operating platform and the slitting mechanism.

8. The automatic quality inspection machine according to claim 1, wherein the display device is provided directly above the button operating platform.

9. The automatic quality inspection machine according to claim 8, wherein the button operating platform includes an operation button which is electrically connected to the main controller.

10. The automatic quality inspection machine according to claim 1, wherein the frame further comprises a human-computer operating system; the human-computer operating system is electrically connected to the main controller.

11. A control method for the automatic quality inspection machine according to claim 1, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others;
    pressing a start operation button at the button operating platform;
    photographing a label to acquire an image by a camera which is assisted by a light source;
    transmitting the image to the main controller by the inspection mechanism;
    transmitting the image from the main controller to a display device to analyze the image;
    moving the label to the slitting mechanism when the main controller detects that the label is free from defects; stopping the label at the button operating platform when the main controller detects a defect in the label, moving the label to the slitting mechanism after processing the label with the defect;
    slitting the label into two parts or more parts by the slitting mechanism according to the equipment parameters set;
    installing the label strip at the second rolling airshaft or the first rolling airshaft after the first rolling airshaft or the second rolling airshaft collects all labels.

12. A control method for the automatic quality inspection machine according to claim 2, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others;
    pressing a start operation button at the button operating platform;
    photographing a label to acquire an image by a camera which is assisted by a light source;
    transmitting the image to the main controller by the inspection mechanism;
    transmitting the image from the main controller to a display device to analyze the image;
    moving the label to the slitting mechanism when the main controller detects that the label is free from defects; stopping the label at the button operating platform when the main controller detects a defect in the label, moving the label to the slitting mechanism after processing the label with the defect;
    slitting the label into two parts or more parts by the slitting mechanism according to the equipment parameters set;
    installing the label strip at the second rolling airshaft or the first rolling airshaft after the first rolling airshaft or the second rolling airshaft collects all labels.

13. A control method for the automatic quality inspection machine according to claim 3, wherein it comprises the following steps:
    installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;
    setting equipment parameters in a human-computer operating system, the equipment parameters include paper movement speed, slitting function, traction tension, among others;
    pressing a start operation button at the button operating platform;
    photographing a label to acquire an image by a camera which is assisted by a light source;
    transmitting the image to the main controller by the inspection mechanism;
    transmitting the image from the main controller to a display device to analyze the image;
    moving the label to the slitting mechanism when the main controller detects that the label is free from defects; stopping the label at the button operating platform when the main controller detects a defect in the label, moving the label to the slitting mechanism after processing the label with the defect;
    slitting the label into two parts or more parts by the slitting mechanism according to the equipment parameters set;

installing the label strip at the second rolling airshaft or the first rolling airshaft after the first rolling airshaft or the second rolling airshaft collects all labels.

14. A control method for the automatic quality inspection machine according to claim 4, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others;

pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; stopping the label at the button operating platform when the main controller detects a defect in the label, moving the label to the slitting mechanism after processing the label with the defect;

slitting the label into two parts or more parts by the slitting mechanism according to the equipment parameters set;

installing the label strip at the second rolling airshaft or the first rolling airshaft after the first rolling airshaft or the second rolling airshaft collects all labels.

15. A control method for the automatic quality inspection machine according to claim 5, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others;

pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; stopping the label at the button operating platform when the main controller detects a defect in the label, moving the label to the slitting mechanism after processing the label with the defect;

slitting the label into two parts or more parts by the slitting mechanism according to the equipment parameters set;

installing the label strip at the second rolling airshaft or the first rolling airshaft after the first rolling airshaft or the second rolling airshaft collects all labels.

16. A control method for the automatic quality inspection machine according to claim 6, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others;

pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; stopping the label at the button operating platform when the main controller detects a defect in the label, moving the label to the slitting mechanism after processing the label with the defect;

slitting the label into two parts or more parts by the slitting mechanism according to the equipment parameters set;

installing the label strip at the second rolling airshaft or the first rolling airshaft after the first rolling airshaft or the second rolling airshaft collects all labels.

17. A control method for the automatic quality inspection machine according to claim 7, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others;

pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects; stopping the label at the button operating platform when the main controller detects a defect in the label, moving the label to the slitting mechanism after processing the label with the defect;

slitting the label into two parts or more parts by the slitting mechanism according to the equipment parameters set;

installing the label strip at the second rolling airshaft or the first rolling airshaft after the first rolling airshaft or the second rolling airshaft collects all labels.

18. A control method for the automatic quality inspection machine according to claim 8, wherein it comprises the following steps:

installing a roll-type printing product at an unrolling device; allowing a label strip to sequentially pass a first corrector, an inspection mechanism, a first traction device, a button operating platform, a second corrector, a second traction device, and a slitting mechanism along guiding rollers in a paper movement route; installing the label strip at a first rolling airshaft or a second rolling airshaft;

setting equipment parameters in a human-computer operating system, the equipment parameters include paper movement speed, slitting function, traction tension, among others;

pressing a start operation button at the button operating platform;

photographing a label to acquire an image by a camera which is assisted by a light source;

transmitting the image to the main controller by the inspection mechanism;

transmitting the image from the main controller to a display device to analyze the image;

moving the label to the slitting mechanism when the main controller detects that the label is free from defects;

stopping the label at the button operating platform when the main controller detects a defect in the label, moving the label to the slitting mechanism after processing the label with the defect;

slitting the label into two parts or more parts by the slitting mechanism according to the equipment parameters set;

installing the label strip at the second rolling airshaft or the first rolling airshaft after the first rolling airshaft or the second rolling airshaft collects all labels.

\* \* \* \* \*